Patented Dec. 26, 1950

2,535,458

UNITED STATES PATENT OFFICE 2,535,458

PRODUCTION OF FORMALS

Max O. Robeson, Corpus Christi, Tex., assignor to Celanese Corporation of America, a corporation of Delaware No Drawing. Application May 29, 1948,
Serial No. 30,181

10 Claims. (Cl. 260—615)

This invention relates to the preparation of organic compounds and relates more particularly to an improved process for the production of formals, acetals and ketals.

An object of this invention is the provision of an improved process for the production of formals, acetals and ketals whereby said compounds are obtained in increased yields.

Another object of this invention is to provide a process for the production of formals, acetals and ketals by the reaction of a carbonyl compound such as an aldehyde or ketone with an alcohol in the presence of an entraining agent adapted to remove the water which is formed as a product of the reaction.

Other objects of this invention will appear from the following detailed description.

The reaction of an aldehyde or ketone with a monohydric or polyhydric alcohol in the presence of an acid catalyst yields organic compounds containing ether linkages generally identified as formals, acetals or ketals. Formals are obtained when the aldehyde employed is formaldehyde. Acetals are obtained when the aldehyde employed is acetaldehyde or a higher aldehyde such as propionaldehyde, butyraldehyde, benzaldehyde, toluyl aldehyde or other aliphatic or aromatic aldehyde. Ketals are obtained when the carbonyl compound is an aliphatic ketone such as acetone methyl ethyl ketone or diethyl ketone, for example, or an aromatic ketone such as acetophenone, benzophenone and the like. The reaction whereby said formals, acetals or ketals are formed is well-known in the art as a generic reaction of carbonyl compounds, when employing an acid catalyst, and water is formed as a product of the reaction. The reaction is, furthermore, a reversible one and, when equilibrium is reached, the yield of the desired formal, acetal or ketal is only about 50 to 60% of theoretical. To separate the formal, acetal or ketal formed from the reaction mixture, the acid catalyst is neutralized, unreacted aldehyde or ketone destroyed, the unreacted alcohol removed and the formal, acetal or ketal formed then distilled off. Since yields of only 50 to 60% of theoretical are obtained, the loss of unreacted aldehyde or ketone is considerable and renders the process uneconomical.

I have now found that formals, acetals and ketals may be obtained in substantially higher yields by the reaction of an aldehyde or ketone with a monohydric or polyhydric alcohol in the presence of an acid catalyst if the water of reaction is continuously removed therefrom as an azeotrope as it is formed. This may be effected by adding to the reaction mixture a water-immiscible organic liquid forming an azeotrope with water and which has a boiling point below that of the reaction products. The continuous removal of the water of reaction causes the equilibrium of the reversible reaction to be shifted substantially toward completion with the result that the yield of formal, acetal or ketal obtained is greatly increased. The use of entraining agents such as, for example, benzene, cyclohexane, pentane, hexane or toluene has been found to yield highly satisfactory results.

In carrying out the reaction whereby said formals, acetals or ketals are obtained, usually from 0.5 to 0.9 mol of the aldehyde or ketone are employed for each mol of alcohol in the reaction mixer. As catalysts, acids such as sulfuric acid, hydrochloric acid, phosphoric acid or toluene sulfonic acid are satisfactory, the catalyst being preferably employed in an amount of from 0.2 to 1.5 mol per cent. In effecting the reaction, the acid catalyst is first added to the alcohol employed, after which the entraining agent in an amount of from about 1 to 2 mols is added. The mixture obtained is heated almost to refluxing temperature and the aldehyde or ketone gradually added as the temperature is brought up to the reflux. The water of reaction is continuously removed as an azeotrope with the entraining agent as it is formed. The azeotrope is condensed, the water layer separating out is decanted and the entraining agent is returned, if desired, to the reaction mixture. When no more water separates out in the decanter the reaction is considered to be complete.

The acid catalyst in the reaction mixture is then neutralized with aqueous sodium hydroxide and, for the purpose of destroying any residual aldehyde, a sufficient excess of the sodium hydroxide solution is added to the reaction mixture. The reaction mixture is preferably refluxed again for a short time after the caustic addition to remove the water which is added with the sodium hydroxide. After cooling the reaction mixture, the insoluble inorganic salt formed by neutralization of the acid catalyst is filtered off and the reaction mixture which remains is fractionated. The reaction mixture is preferably maintained slightly alkaline during fractionation, and the unreacted alcohol and any entraining agent present are distilled off. The formal, acetal or ketal formed is then removed by further distillation, preferably under reduced pressure. Yields of formals, acetals or ketals of up to about 80 to 90% of theoretical are obtained by my novel process.

In order further to illustrate the novel process of my invention but without being limited thereto the following example is given:

*Example*

50 mols of n-propyl alcohol are mixed with 0.33 mol of sulfuric acid which has been diluted over cracked ice and then about 1.8 mols of cyclohexane added thereto. The mixture obtained is then heated almost to refluxing temperature and 44.5 mols of 36.4% aqueous formaldehyde added slowly as the mixture is refluxed. The reaction proceeds during reflux. The water formed as the reaction product distills over continuously as a cyclohexane-water azeotrope which is condensed and the water layer which separates out is continuously removed. The cyclohexane is recycled back to the reaction zone. The reaction is continued until no more water separates out. Twice the theoretical amount of 50% aqueous sodium hydroxide solution necessary to neutralize the sulfuric acid catalyst is added, the excess acting to polymerize and resinify the unreacted formaldehyde. The mixture is then refluxed further in order to remove the water added with the sodium hydroxide solution, the water coming over, of course, as a cyclohexane-water azeotrope. When all the water has been removed, the reaction mixture is filtered to separate the precipitated sodium sulfate and the mixture then charged to a fractionating column. After the addition of a sufficient amount of calcium carbonate to act as a buffer for maintaining a slight alkalinity, any unreacted propyl alcohol, together with the cyclohexane present, is then removed and the di-n-propyl formal reaction product distilled off under a pressure of 70 mm. of mercury. A yield of 85% of theoretical of the di-n-propyl formal is obtained, based on the n-propyl alcohol employed.

It is to be understood that the foregoing detailed description is given merely by way of illustration and that many variations may be made therein without departing from the spirit of my invention.

Having described my invention, what I desire to secure by Letters Patent is:

1. Process for the production of formals by the reaction of an alcohol with formaldehyde in the presence of an acid catalyst, which comprises mixing the alcohol and acid catalyst with a water-immiscible entraining agent forming a constant boiling azeotrope with water, heating the mixture to about reflux temperature, slowly adding aqueous formaldehyde to the mixture while refluxing the latter and continuously removing the water of reaction as formed from the reaction mixture with the aid of said entraining agent.

2. Process for the production of formals by the reaction of an alcohol with formaldehyde in the presence of sulfuric acid as the catalyst, which comprises mixing the alcohol and sulfuric acid catalyst with a water-immiscible entraining agent forming a constant boiling azeotrope with water, heating the mixture to about reflux temperature, slowly adding aqueous formaldehyde to the mixture while refluxing the latter and continuously removing the water of reaction as formed from the reaction mixture with the aid of said entraining agent.

3. Process for the production of formals by the reaction of an aliphatic alcohol with formaldehyde in the presence of sulfuric acid, as the catalyst, which comprises mixing the aliphatic alcohol and sulfuric acid catalyst with a water-immiscible entraining agent forming a constant boiling azeotrope with water, heating the mixture to about reflux temperature, slowly adding aqueous formaldehyde to the mixture while refluxing the latter and continuously removing the water of reaction as formed from the reaction mixture with the aid of said entraining agent.

4. Process for the production of formals by the reaction of an aliphatic alcohol with formaldehyde in the presence of sulfuric acid as the catalyst, which comprises mixing the aliphatic alcohol and sulfuric acid catalyst with cyclohexane, heating the mixture to about reflux temperature, slowly adding aqueous formaldehyde to the mixture while refluxing the latter and continuously removing the water of reaction as formed from the reaction mixture with the aid of the cyclohexane as the water-entraining agent.

5. Process for the production of formals by the reaction of an aliphatic alcohol with formaldehyde in the presence of sulfuric acid as the catalyst, which comprises forming a reaction mixture of the aliphatic alcohol and sulfuric acid catalyst with benzene, heating the reaction mixture to about reflux temperature, slowly adding aqueous formaldehyde to the mixture while refluxing the latter, and continuously removing the water of reaction as formed from the reaction mixture with the aid of the benzene as the water-entraining agent.

6. Process for the production of formals by the reaction of an aliphatic alcohol with formaldehyde in the presence of sulfuric acid as the catalyst, which comprises forming a reaction mixture of the aliphatic alcohol and sulfuric acid catalyst with pentane, heating the reaction mixture to about reflux temperature, slowly adding aqueous formaldehyde to the mixture while refluxing the latter, and continuously removing the water of reaction as formed from the reaction mixture with the aid of the pentane as the water-entraining agent.

7. Process for the production of di-n-propyl formal by the reaction of n-propyl alcohol with formaldehyde in the presence of sulfuric acid as catalyst, which comprises forming a reaction mixture of n-propyl alcohol, sulfuric acid and a water-immiscible entraining agent forming a constant boiling azeotrope with water, heating the reaction mixture to about reflux temperature, slowly adding formaldehyde to the reaction mixture while refluxing the latter, and continuously removing the water of reaction as formed from the reaction mixture with the aid of said water-immiscible entraining agent.

8. Process for the production of di-n-propyl formal by the reaction of n-propyl alcohol with formaldehyde in the presence of sulfuric acid as catalyst, which comprises forming a reaction mixture of n-propyl alcohol, sulfuric acid and cyclohexane, heating the reaction mixture to about reflux temperature, slowly adding formaldehyde to the reaction mixture while refluxing the latter and continuously removing the water of reaction as formed from the reaction mixture with the aid of the cyclohexane as the water-entraining agent.

9. Process for the production of di-n-propyl formal by the reaction of n-propyl alcohol with formaldehyde in the presence of sulfuric acid as catalyst, which comprises forming a reaction mixture of n-propyl alcohol, sulfuric acid and benzene, heating the reaction mixture to about reflux temperature, slowly adding formaldehyde to the reaction mixture while refluxing the latter and continuously removing the water of reaction as formed from the reaction mixture with the aid of the benzene as the water-entraining agent.

10. Process for the production of di-n-propyl formal by the reaction of n-propyl alcohol with formaldehyde in the presence of sulfuric acid as catalyst, which comprises forming a reaction mixture of n-propyl alcohol, sulfuric acid and pentane, heating the reaction mixture to about reflux temperature, slowly adding formaldehyde to the reaction mixture while refluxing the latter, and continuously removing the water of reaction as formed from the reaction mixture with the aid of the pentane as the water-entraining agent.

MAX O. ROBESON.

REFERENCES CITED

The following references are of record in the file of this patent:

UNITED STATES PATENTS

| Number | Name | Date |
| --- | --- | --- |
| 1,850,836 | Guinot | Mar. 22, 1932 |
| 2,360,959 | MacDowell et al. | Oct. 24, 1944 |
| 2,374,494 | Morey | Apr. 24, 1945 |